(12) United States Patent
Ohara et al.

(10) Patent No.: US 6,297,812 B1
(45) Date of Patent: *Oct. 2, 2001

(54) INFORMATION DISPLAY SYSTEM FOR ELECTRONICALLY READING A BOOK

(75) Inventors: Makoto Ohara, Tokyo; Hirotsugu Tomizawa, Saitamaken; Shinichirou Sugiura, Tokyo, all of (JP)

(73) Assignee: Sega Enterprises, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/465,499

(22) Filed: Dec. 16, 1999

Related U.S. Application Data

(63) Continuation of application No. 08/429,885, filed on Apr. 27, 1995, now Pat. No. 6,052,117, which is a continuation of application No. 08/265,693, filed on Jun. 23, 1994, now Pat. No. 5,485,176, which is a continuation of application No. 07/952,329, filed on Sep. 28, 1992, now abandoned.

(30) Foreign Application Priority Data

Nov. 21, 1991 (JP) .................................... 3-332541

(51) Int. Cl.[7] .................................................. G09G 5/00
(52) U.S. Cl. .......................... 345/173; 345/179; 345/901
(58) Field of Search ................................... 345/173, 156, 345/179, 168, 175, 174, 901; 178/18.01–18.11, 19.01–19.07

(56) References Cited

U.S. PATENT DOCUMENTS

| 4,136,336 | 1/1979 | Abe et al. . |
|---|---|---|
| 4,782,335 | 11/1988 | Gussin . |
| 4,802,092 | 1/1989 | Harte . |
| 4,809,246 | 2/1989 | Jeng . |
| 4,839,634 | 6/1989 | More et al. . |
| 4,862,152 | 8/1989 | Milner . |
| 4,862,497 | 8/1989 | Seto et al. . |
| 4,884,974 | 12/1989 | DeSmet . |
| 4,890,096 | 12/1989 | Taguchi et al. . |
| 4,891,474 | 1/1990 | Kelly . |
| 4,933,544 | 6/1990 | Tamaru . |

FOREIGN PATENT DOCUMENTS

| 0313976 | 10/1988 | (EP) . |
|---|---|---|
| 0364884 | 10/1989 | (EP) . |
| 0455147 | 4/1991 | (EP) . |
| 524328 | 4/1977 | (JP) . |
| 5410632 | 1/1979 | (JP) . |
| 55174798 | 5/1980 | (JP) . |
| 58114287 | 7/1983 | (JP) . |
| 616797 | 2/1986 | (JP) . |
| 6218740 | 2/1987 | (JP) . |
| 9015402 | 12/1990 | (WO) . |
| 9107715 | 5/1991 | (WO) . |
| 9215077 | 9/1992 | (WO) . |

*Primary Examiner*—Dennis-Doon Chow
(74) *Attorney, Agent, or Firm*—Price and Gess (57) ABSTRACT

An information display system having a housing with a location for receiving a document such as a book is provided. A location detection circuit is mounted on the housing adjacent the document and can determine any subjective selection of a location on the document. The document can have a plurality of indicia. When such indicia is selected, a control circuit can retrieve the information from a read only memory and appropriately display the information in an audible or visual manner.

12 Claims, 7 Drawing Sheets

INFORMATION DISPLAY SYSTEM FOR ELECTRONICALLY READING A BOOK

This is a continuation of pending U.S. Ser. No. 08/429,885, filed on Apr. 27, 1995 now U.S. Pat. No. 6,052,117, which is a continuation of U.S. Ser. No. 08/265,693, filed on Jun. 23, 1994, and issued as U.S. Pat. No. 5,485,176 on Jan. 16, 1996, which is a continued prosecution application of U.S. Ser. No. 07/952,329, filed on Sep. 28, 1992 (abandoned).

BACKGROUND OF THE INVENTION

1. Field of the Invention

The present invention relates to an integration of printed text and images with a software program and a computer-driven display system and, more particularly, to an electronic book that permits the operator to designate selected indicia on pages of the book, which are then entered into the computer system for appropriate display in an audio and visual manner.

2. Description of Related Art

Electronic instruments that use cards made by printing or describing graphic images as figures, letters, codes, etc., on the surface of sheets of paper, etc., with special conductive ink or special paint, and that read the information described on such cards with a touch pen, etc., and play back audio and video signals via external instruments such as television sets have been used in the past for the purposes of play, learning, etc.

However, such cards have usually required special processing such as conductive paint, bar codes, etc., for the purpose of reading the information. The electronic cards which use conductive paint have the following problems:

1. The printing process is complicated.
2. It is difficult to render in natural colors.
3. The printed surface deteriorates, causing difficulty in reading.
4. Because a connector is necessary, electrical failure is likely to occur.
5. The bookbinding process is complicated, etc.

The electronic cards using bar codes have the following problems:

1. Because considerable space is needed for printing the bar code, the quantity of information contained in a page is therefore limited.
2. The aesthetic rendering is inhibited by the bar code.
3. If the bar code is blurred or otherwise marred, it will become difficult to read, etc.

Thus, the computer field is still seeking to provide an information display system utilizing an electronic book that can resolve the problems that have occurred in the past.

SUMMARY OF THE INVENTION

An electronic book-reading system and information storage system is capable of reading the contents of the sheets of a book having various information such as figures, letters, codes, etc., applied to the surface of the sheets in the book. The book is mounted at a fixed location, and the user can arbitrarily designate a specific location to identify the particular indicia on the sheet. A sensor system can detect the arbitrarily-designated location and, in some cases, can further employ a page detection system to detect which specific page is being addressed and whether it is the front or the back of the page. A location detection circuit can, from a determination of an absolute location signal or a predetermined reference point, plus the arbitrarily-designated location point entered by the operator, determine which specific indicia is being designated by the operator. A ROM, that can be integrated with the electronic book or can exist separately, can be appropriately addressed on the basis of the sensor system to thereby provide the electronic information corresponding to the specific figures, letters, codes, etc., that are displayed in the electronic book. The ROM which has memorized the location of the indicia and related information at that location can be addressed and downloaded for subsequent processing, for example, through a computer-driven system that can provide audio and video images.

Various forms of location detection circuits can be utilized, such as an electromagnetic induction system which includes a transmitter for generating electro-magnetic signals to a planar panel having multiple electrodes arranged in a horizontal direction and a vertical direction at fixed locations. An X direction decoder and a Y direction decoder can be responsive to a sensor that designates an arbitrary location on the planar panel.

Alternatively, an optical system can be utilized having a grid of optical light beams defining a crossing pattern on a planar surface, with corresponding photo-receptors indicating the receipt of each light beam. A light-intercepting or blocking member can be positioned in an arbitrary location on the panel. An X direction location circuit and a Y direction location circuit can detect the relative coordinates of the blocked light beams, to thereby provide information for a detection control circuit to determine a specific arbitrarily-designated location.

Additionally, an ultrasonic system can be utilized wherein an ultrasonic generator can be used to designate coordinates within a fixed location. At least three ultrasonic sensors can receive a signal of the ultrasonic generator. From this information, a detection circuit can determine the relative location of the ultrasonic generator to designate an arbitrary position.

In addition, a page detection system is also provided wherein multiple perimeter sensors can detect the shape of the perimeter of a sheet of a book, and thereby define which page is being addressed. As can be appreciated, a ROM storing a program containing the information on the sheet can be integrated with the form of the electronic book, or it can be remotely located in a housing that can further house both audible speakers and monitors such as CRT tubes and liquid crystal displays. The individual sheets in the book can be of any configuration, such as squares, circles, clouds, etc., and is preferably of a thin body of paper or card material. While it is contemplated that the sheets will be planar, it is also possible for them to have concave or convex surfaces, or to have relief surfaces or perforated surfaces. The descriptions of the terminology "vertical direction" and "horizontal direction" are relative, and are simply stated herein for purposes of defining a coordinate system.

As can be readily appreciated, the information contained within the sheet is indirectly outputted by reading the contents of a ROM which has the same recorded information that has been mapped to define the specific location coordinates with the sheet. When the sheet is located at a fixed location, a determination of the coordinates relative to that fixed location will then identify the address of the information contained in the ROM. In some of the detection systems, the coordinates can also be defined on a time base, and a signal generated by the sensor can determine the coordinate by comparing the time base with the received signal.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

BRIEF DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide an electronic book information display system.

In an electronic book-reading process or device of this invention, the following measures are adopted: the contents of the sheet or the book consisting of a number of the sheets bound together on which such information as figures, letters, codes, etc., are applied are mounted at a fixed location on a plane. An arbitrarily-assigned location within the aforementioned fixed location is detected by a location detection circuit. A page detection circuit can also detect which page is being addressed. The absolute location signal of the aforementioned arbitrarily-assigned location is obtained by a location signal detected by the location detection circuit and the page signal obtained by the page detection circuit, if necessary. The absolute location signal and the contents of a ROM in which such information as specific figures, letters, codes, etc., are preassigned and memorized for the absolute location of the sheet or book are compared, and the contents of the ROM memorized at the matched absolute location is output as the information signal. The information signal is output as at least one of either an audio or a video signal.

In addition, a device which reads the contents of the sheet or the book includes a location detection means that detects the coordinates of the sheet or the page of the book mounted at a fixed location, and a page detection means which detects the front or the back of the sheet or the page of the aforementioned book. An absolute location detection circuit detects an absolute location by a location signal obtained by the location detection means and the page signal obtained by the page detection means, and obtains the absolute location signal. A control device having a control circuit compares the contents of the ROM in which the information for the absolute location of the sheet or book is stored beforehand and the absolute location signal obtained by the absolute location detection circuit, and outputs the information at the matched location as the information signal. This information can be output as at least either an audio or a video signal to an output playback device which plays back the output of the control circuit.

The location detection means can be an electromagnetic induction system, composed of a transmitting part which generates electromagnetic signals, a planar panel having multiple electrodes arranged in a horizontal direction and a vertical direction at a fixed location, an X direction decoder and a Y direction decoder which provide the electromagnetic signals to the electrodes successively, a receiving part which detects the electromagnetic signal when it is near the planar panel, and a detection control circuit which obtains the location signal of the coordinate in the planar panel by a sending signal from the transmitting circuit and the reception signal obtained from the receiving circuit.

Alternatively, the location detection means can be an optical system, composed of multiple emission parts, each set in the vertical direction and the horizontal direction surrounding a fixed location, a light-intercepting part which detects the light from each of the emission parts, an X direction location detection part which detects the shaded state of the light at the vertical direction light-intercepting part and comprises the vertical detection signal, a Y direction location detection part which detects the shaded state of the light at the horizontal direction light-intercepting part and comprises the horizontal detection signal, and a detection control circuit which obtains the location signal of the coordinates within the fixed location by the vertical detection signal and the horizontal detection signal.

The location detection means can include an ultrasonic system composed of an ultrasonic generator which can assign coordinates within a fixed location, at least three ultrasonic sensors which receive the signal of the ultrasonic generator, a receiving part which receives each of the multiple ultrasonic reception signals from the ultrasonic sensors and outputs the reception signal, a transmitting part which supplies the ultrasonic signal to the ultrasonic generator by a sending signal, and a detection control circuit which obtains the location signal of the assigned coordinates within a fixed range by the reception signal and the sending signal.

The page detection means can be composed of multiple perimeter sensors which detect the shape of the perimeter of the sheet or a book consisting of a number of sheets bound together, and a page detection control circuit which determines the page by detecting the state of the multiple perimeter sensors.

Figure 1:
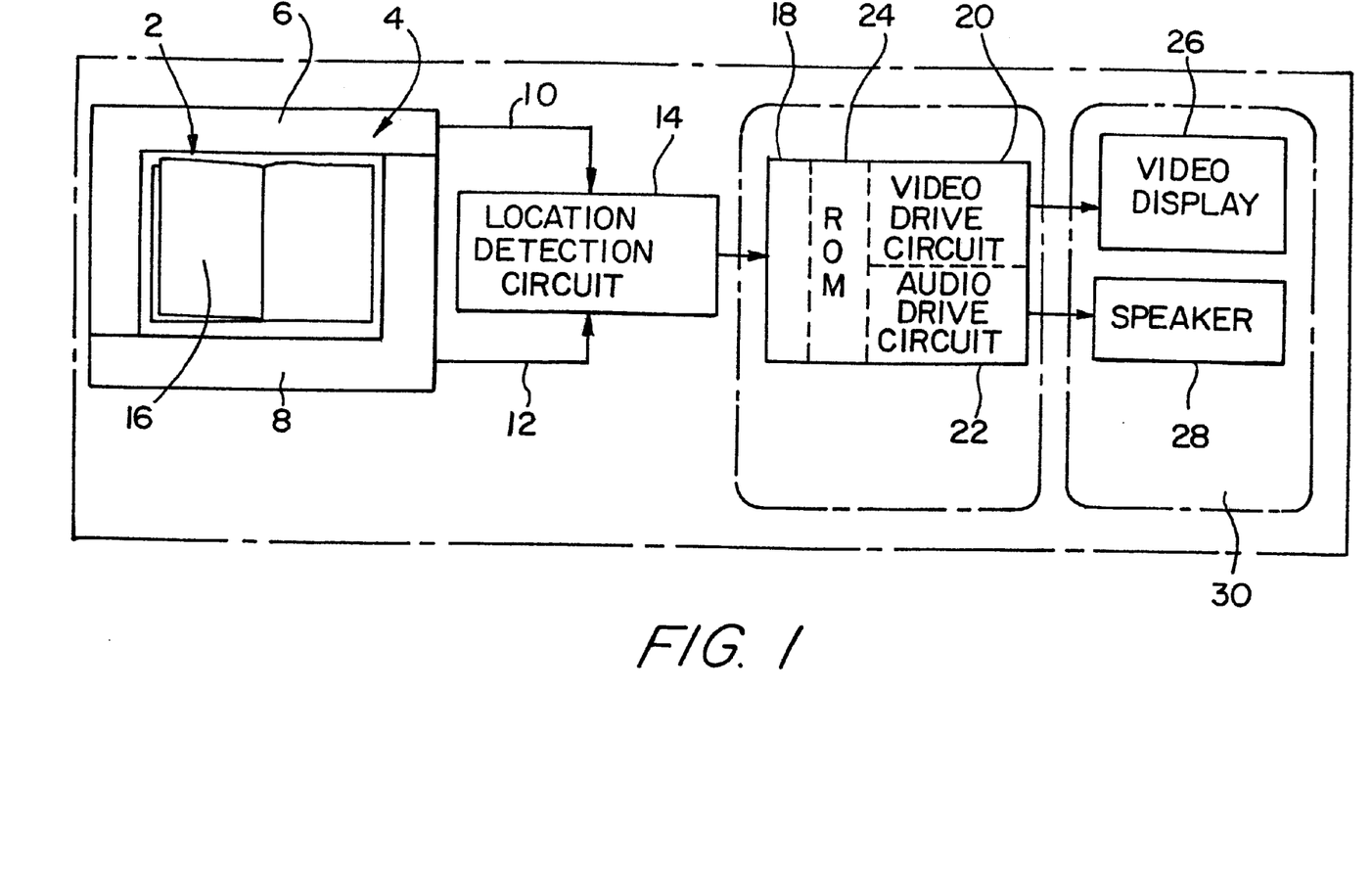
FIG. 1 is a schematic diagram of one embodiment of the present invention.

Referring to FIG. 1, an electronic book and information processing system is disclosed wherein the electronic book 2 is positioned at a fixed location on a housing of the reading device 4. A location detection sensor system 6 extends across the top and left side of the electronic book. A page detection system 8 is also provided across the bottom and right side of the electronic book. Respective outputs from the location detection system 6 on line 10 and the page detection system 8 on line 12 are forwarded to an absolute location detection circuit 14. Thus, if the user designates particular coordinates within the electronic book 2, these coordinates are detected by the location detection system 6 and sent to the location detection circuit 14 as a location signal. In addition, the page detection system can detect a specific page 16, and a page signal can be sent to the absolute location detection circuit 14. If the insert into the reading device 4 is simply a sheet, the page detection circuit will output a page signal indicating no pages.

The output of the location detection circuit provides information of the designated coordinates within the page of the electronic book 2. The contents which are printed on the surface of the book 2, or the information to which it is related, are stored relative to the coordinates of each page of the book 2 in a ROM 24. The contents of this ROM are addressed to match the coordinates of the absolute location signal. The control circuit 18 can retrieve the information from those addresses in the ROM 24 and use them to drive a video drive circuit 20 and/or an audio drive circuit 22. The ROM 24 is shown remote from the electronic book 2, but could be integrated physically with the electronic book 2. A video signal from the video drive circuit 20 can drive a video display 26, which can take the form of an LCD display, a CRT monitor, etc.

Additionally, the video display can be integrated into a unitary cabinet 30 or it can be remote, and a television receiver can be driven. The audio drive circuit 22 can also appropriately drive a speaker 28, which can again be integrated into a unitary cabinet 30 or can be remote. For example, the combination of the video display and speaker can be considered to be an output playback device 30 that can be a stand-alone unit. The video signals and the audio signals are only output if they are recorded in the ROM. It is natural that sometimes it will be only image or only sound, and sometimes it can be a combination of both.

Figure 2:
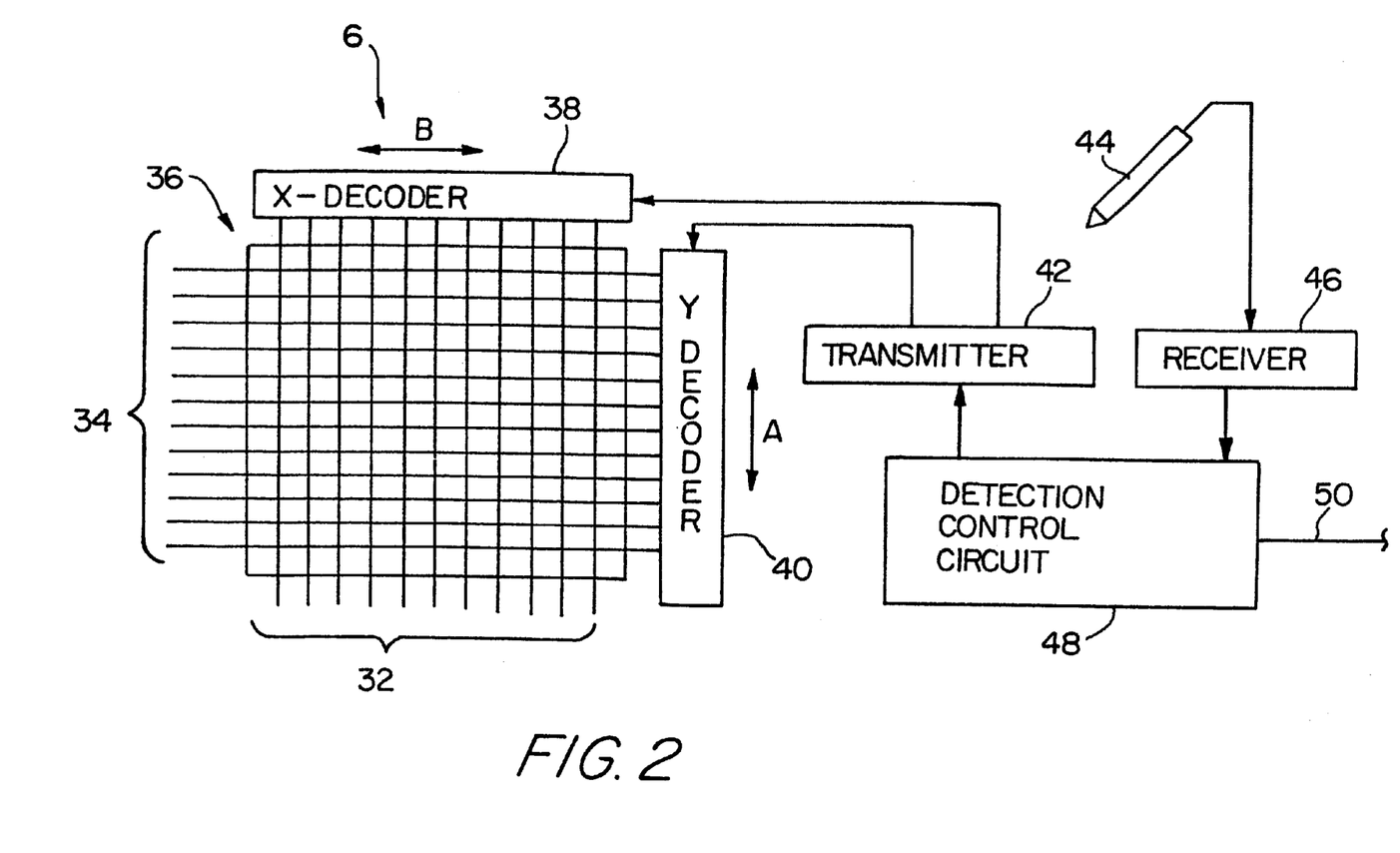
FIG. 2 is a schematic diagram disclosing one embodiment of an electromagnetic detection circuit.

Referring to FIG. 2, a schematic is disclosed of one form of location detection system 6. In this embodiment, an electromagnetic induction system is utilized, and comprises a grid pattern of multiple vertical electrode wires 32 that cross multiple horizontal electrode wires 34. This grid pattern constitutes a planar panel 36. An X direction decoder 38 and a Y direction decoder 40 are, respectively, connected to a transmitter circuit 42. The X direction decoder 38 adds the vertical electromagnetic signals from each of the vertical electrodes in sequential order. In a similar manner, the Y direction decoder 40 adds the horizontal electromagnetic signals from each of the horizontal electrodes in sequential order. A pickup sensor 44 includes a coil which can sense an electromagnetic signal when applied to the planar panel 36.

By placing the pickup sensor 44 adjacent the planar panel 36, it can sense the vertical electromagnetic signal and the horizontal electromagnetic signal that are applied to the respective wire electrodes 32 and 34. These signals are added together, and are then transmitted to a receiver circuit 46. A detection control circuit 48 controls the timing sequence of the electromagnetic signal applied to the vertical electrodes 32 and to the horizontal electrodes 34, respectively. It can thereby determine, from the input from the receiver circuit 46, based upon the same time interval (same clock base), the location of the coil on the pickup sensor 44 adjacent the planar panel 36. Thus, the fixed location is obtained and output as the location signal on line 50.

Figure 3:
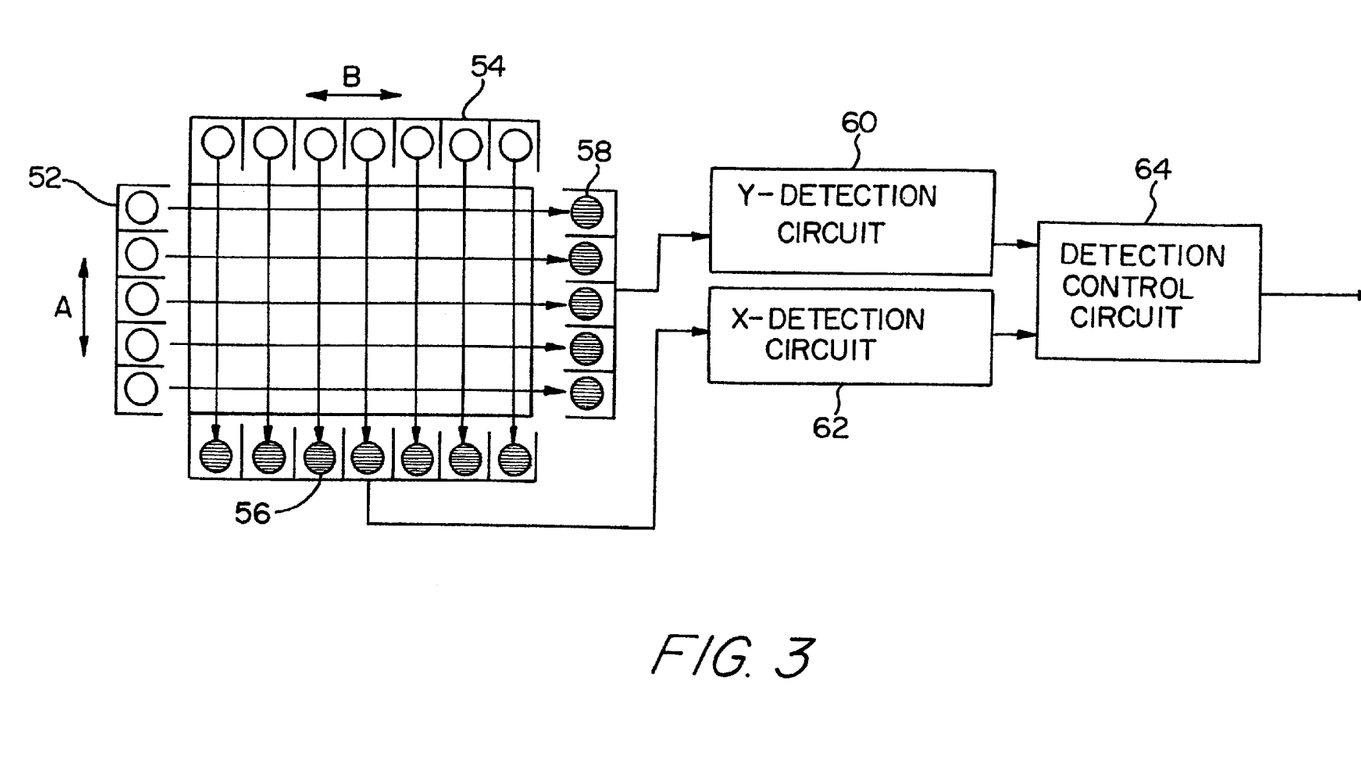
FIG. 3 is a schematic diagram disclosing an alternative embodiment of an optical detection circuit.

Referring to FIG. 3, another schematic drawing is provided of an alternative location detection system. This system is basically an optical system using a linear principle of light. In the vertical direction, arrow A, and the horizontal direction, arrow B, are a series of light emitters 52 and 54, respectively. These respective light emitters emit a grid pattern of light beams to correspondingly-located photodiode receivers 56 in the horizontal plane and photodiode receivers 58 in the vertical plane. A Y detector circuit 60 is connected to the light receiver array 58, while an X detector circuit 62 is connected to the light receiver array 56. The outputs from these respective detection circuits 60 and 62 are directed to a detection control circuit 64 to provide the coordinates of any blocking interference with the light grid.

As can be appreciated, a pointer, or even a finger, can be inserted into the grid pattern of light, to thereby block a vertical and horizontal light beam. By sequentially polling each of the light receiver arrays, the location of the blocked beam can be ascertained, and the coordinates of that position can be determined. This information can then be used to address, for example, a ROM to determine the appropriate stored information for that designated area. As can be appreciated, in operation, the page of the book should be inserted underneath the light grid, and the light grid should have a sufficient number of light beams to accommodate the necessary coordinate system. That is, a fine pattern may require a denser light grid than a coarser pattern would require.

Figure 4:
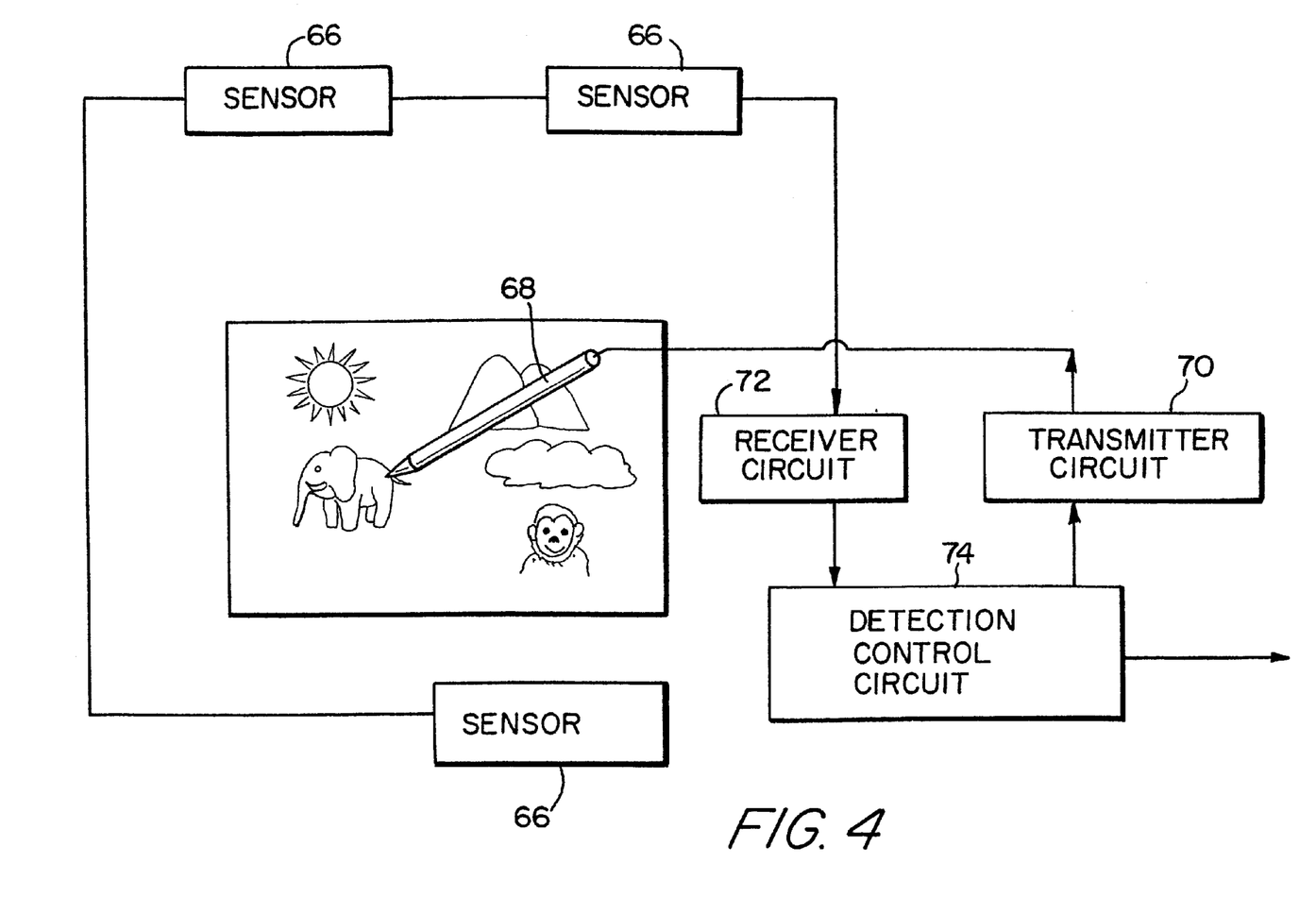
FIG. 4 is another embodiment of an ultrasonic sound detection circuit.

Referring to FIG. 4, an alternative location-detecting system is disclosed, wherein the electronic book 2 has a series of ultrasonic sensors 66 positioned at locations spaced around the electronic book 2. An ultrasonic generator 68 is connected to a transmitter circuit 70 which is capable of generating ultrasound when contacting the surface of the electronic book 2. The ultrasonic sensors 66 will receive the ultrasound signal from the ultrasound generator 68 and will relay it to a receiver circuit 72. The output from the receiver circuit 72 is provided to a detection control circuit 74. The ultrasonic signal that is transmitted to the ultrasonic generator is controlled by the detection control circuit 74, and appropriate modulation of the signal can be added if necessary. The detection control circuit 74 can detect the coordinates of the fixed location specified by the ultrasonic generator 68 by comparing each set location of the ultrasonic sensor 66 on a time basis, and thereby derive a location signal.

Figure 5:
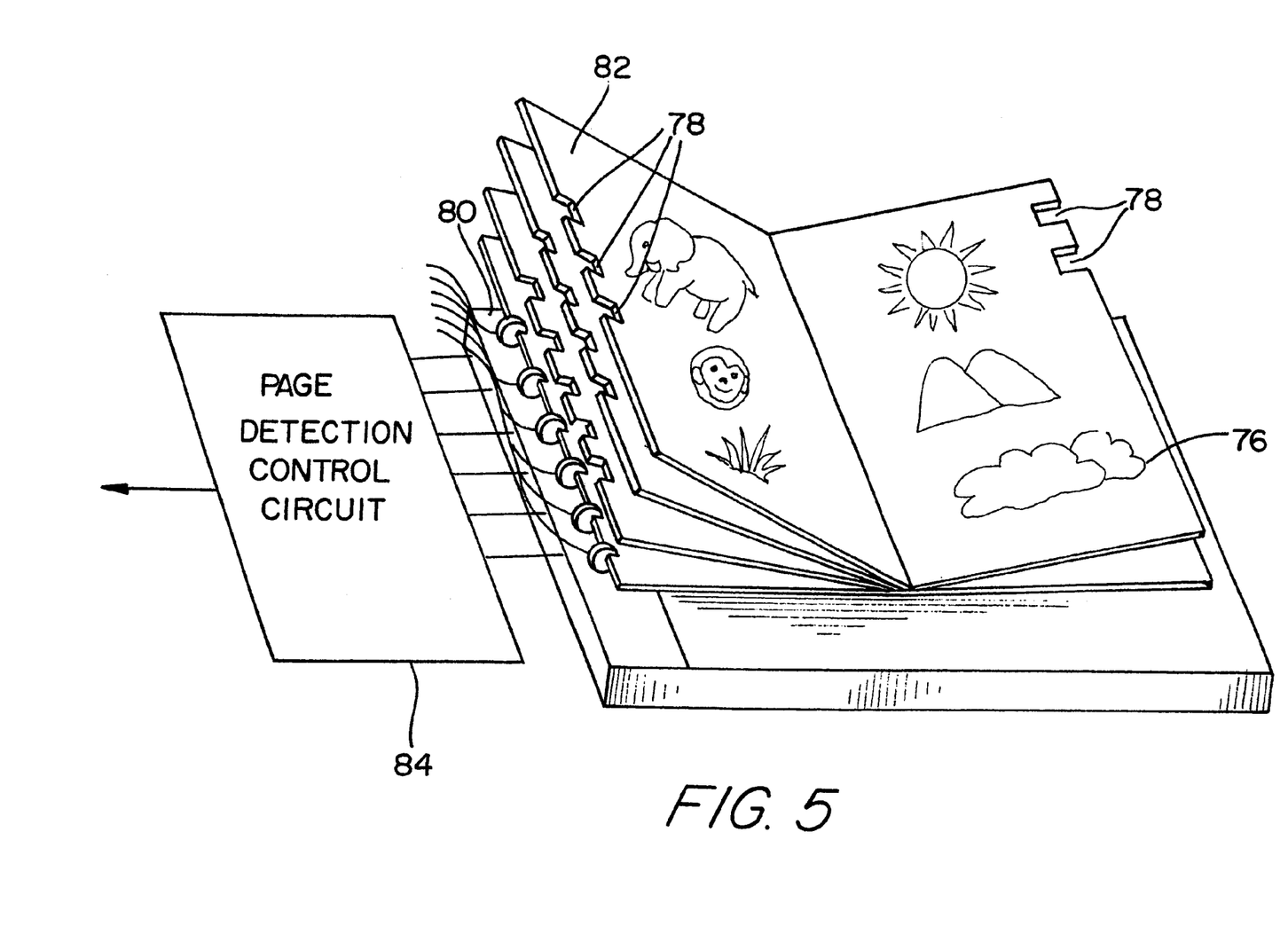
FIG. 5 is a schematic diagram of a page-detection control circuit.

Referring to FIG. 5, a page detection system is disclosed wherein the ultrasonic book 2 has a series of sheets or pages 76 having peripheral notches 78 along the vertical edge of the pages. These notches are coded to identify a specific page. Thus, the notch pattern is unique to a specific page. Perimeter sensors 80 are mounted adjacent one edge of the page detection system and coordinated with the alignment of the notches 78 on the pages 76. These perimeter sensors 80 can detect the light passing through the notches to produce an appropriate signal indicating which page is open. For example, if the light has passed through only three notches, then it can be easily determined that a page 82 is positioned across the sensors 80. A page detection control circuit 84 can poll the sensors and determine which page is being exposed. As can be readily appreciated, various kinds of page settings can be assigned by number, interval, etc., related to the perimeter of the page, to distinguish between the pages.

Figure 6:
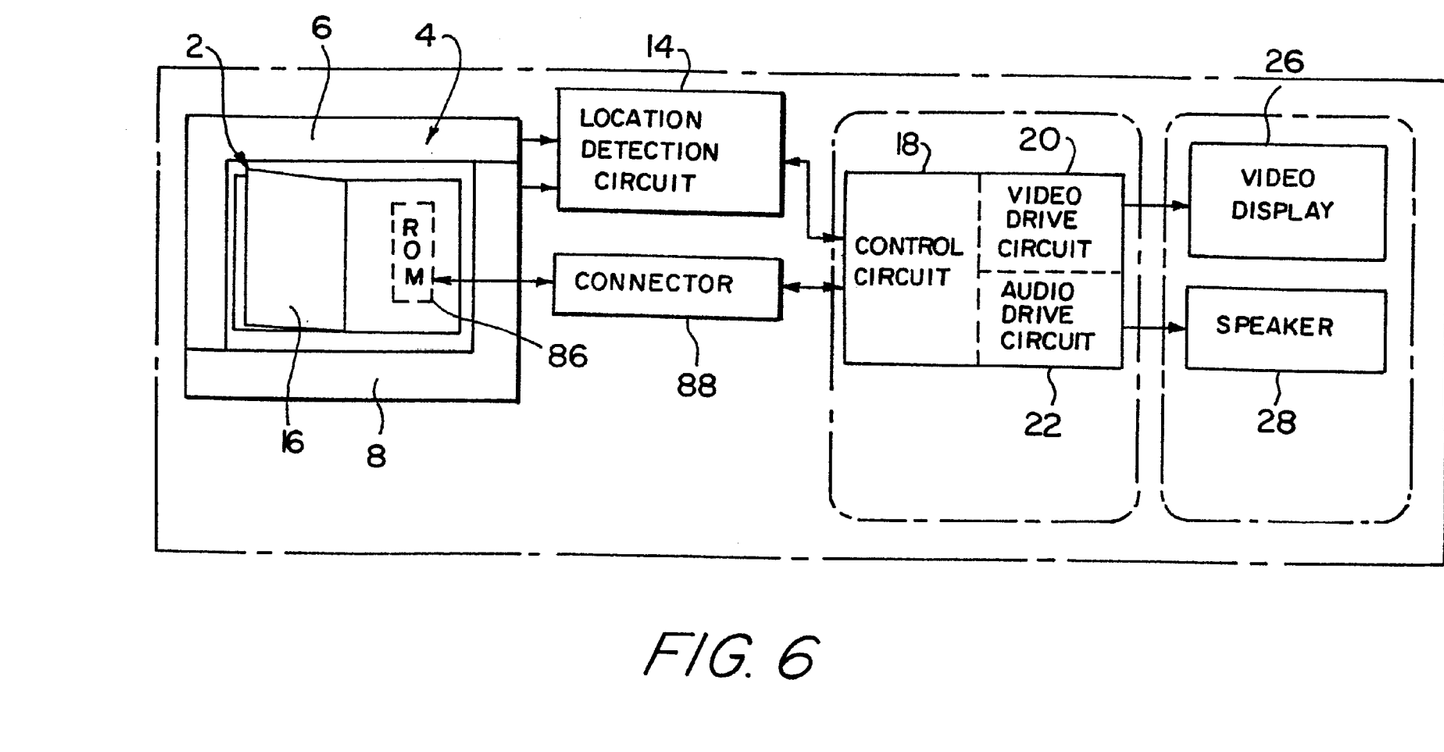
FIG. 6 is a schematic diagram of an information and entertainment system.

Referring to FIG. 6, a schematic drawing of a variation of the embodiment of FIG. 1 is disclosed, wherein a ROM 86 is integrated directly into the electronic book 2. In this regard, a connector 88 is used to connect the ROM 86 with the control circuit 18. Each of the other elements are the same, as set forth in the embodiment of FIG. 1.

As can be readily appreciated, the video display 26 and the speaker 28 can also be integrated with the computer control system as a unitary display device. The display could have a built-in liquid crystal display or a CRT monitor, and can also have a built-in speaker. Alternatively, external speakers and independent television monitors can also be used.

Figure 7:
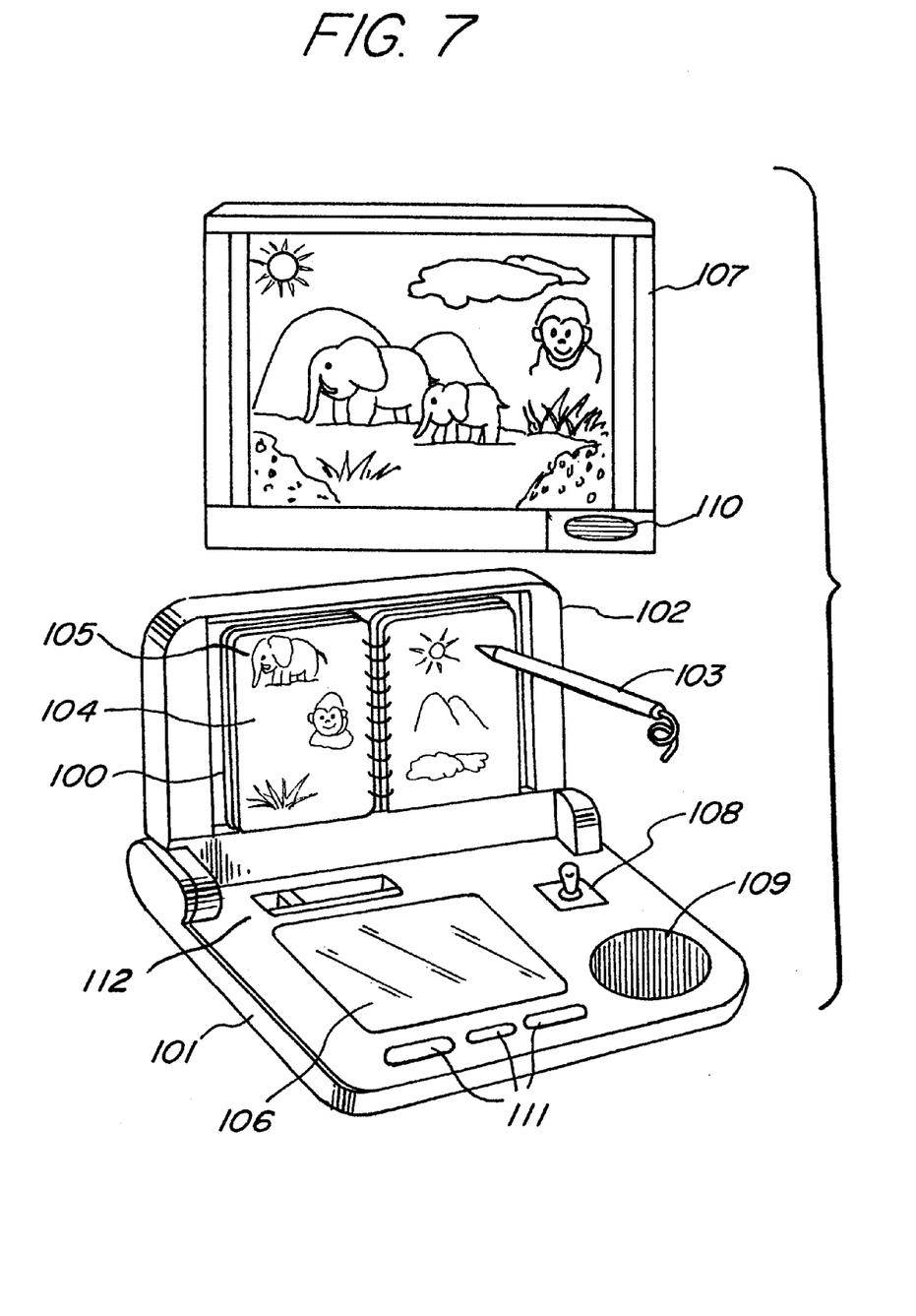
FIG. 7 is a perspective view of an alternative embodiment of the present invention.

Referring to FIG. 7, an embodiment of the present invention is disclosed in the format of a drawing system toy for small children with an electronic book reading device of the present invention.

An electronic book 100 is set within an indented portion of a pivotal back cover 102 of the toy housing. A lower base portion 101 of the toy housing supports operator controls and a touch panel 106. The touch panel 106 can utilize the location detection system described above to define a specific position. While not shown, a television monitor 107 can be interconnected to receive inputs from the user. In operation, the user can utilize the wand or pen 103. The user can touch the electronic book which, for example, can be subject to a location detection circuit on the open page 104. For example, an elephant 105 could be touched, and then subsequently the operator can designate where he or she wishes to place the elephant on the screen of the television monitor 107 by contacting the touch panel 106 with a pen, or even a finger, in an alternative embodiment. A child is even able to relocate the elephant on the television monitor through the use of a joystick input 108. The elephant can move on the screen while making sounds which could be associated with an elephant, from the speaker 109 on the toy device, or from the speaker 110 mounted on the television receiver.

In a similar manner, the other characters and indicia, e.g., monkey, mountain, etc., can be designated from the electronic book 100 and located on the television monitor 107 in order to draw a picture on the television screen. The control buttons 111 can be used for designating the location of characters, while the slide control member 112 can be used for changing the color of the screen or the characters.

As can be appreciated, various alternative arrangements can be utilized to accomplish the purposes of the present invention. For example, the use of the optical detection system can be free from any noise that could be associated with electromagnetic transmissions, and it would not be necessary to use any special pickup devices, pointers, etc. Any rod-shaped body, such as a finger, hand, or pencil that can cast a shadow can be utilized. Because the location detection system can be independent of the specific electronic book or page, there is no necessity to utilize special paints, printing processes, or other special preparations. It is only necessary that the sheet does not interfere with the special location detection circuit that is to be utilized. Thus, the printed indicia can be of a conventional configuration and relatively easily and inexpensively created. The only parameters required are that the information be appropriately located relative to the location detection circuit so that any ROM containing stored information relative to that page can be addressed appropriately by the location detection circuit. In operation, a child can utilize the entertainment drawing system disclosed in FIG. 7 in a highly enjoyable manner. He or she is, in fact, operating with a user-friendly approach to a computer system.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An apparatus for providing data related to an operator's selection, comprising:

a planar panel which is formed so as to removably attach an information storing device on the planar panel, wherein said information storing device comprises: a sheet plate with a plurality of visual indicia, visually recognizable as visual indicia by an operator, printed at locations of the surface thereof, memory means integrated into the information storing device and stored with a plurality of information having data to provide signals for causing a video and/or sound effect related to said visual indicia with addresses representative of locations on the surface of said sheet plate corresponding to positions of the respective visual indicia; and a connector means arranged so as to transmit said packets of information;

a location detection member comprising sensor means functionally associated with said planar panel and arranged so as to provide a location signal which is indicative of the coordinates of the indicium selected from said plurality of visual indicia by the operator;

a connection means detachably connected to the connector means of said information storing device and arranged so as to transmit said plurality of packets of information from said information storing device when said storing device is attached to said planar panel; and a control means, responsive to the location signal supplied from said location detection member, arranged so as to retrieve the data from one of said plurality of packets of information corresponding to the indicium selected by the operator.

2. The apparatus of claim 1, further comprising a video signal generating means arranged so as to provide a video signal for displaying on a display screen an image corresponding to the indicia selected by the operator by referring to the packets of information transmitted from the information storing device.

3. The apparatus of claim 1, wherein said information storing device further comprises a plurality of sheet plates bound together in a book format, each of said sheet plates having a plurality of visual indicia, readable by the operator, printed at locations on the surface thereof, and wherein said location detection member further comprises means for detecting the plate selected from said sheet plates by the operator.

4. An information storing device for use with the apparatus as defined in claim 1 and detachably mountable on the planar panel, comprising a plurality of sheet plates, bound together to form a book, each of said sheet plates being formed with a plurality of visual indicia, visually recognizable as visual indicia by an operator, printed at locations on a surface thereof, memory means integrally assembled with the book and stored with a plurality of packets of data to provide signals for causing a video and/or sound effect related to said visual indicia with addresses representative of locations on the surface of each sheet plate corresponding to positions of the respective visual indicia, and a connector means from which said packets of data are to be transmitted to said apparatus.

5. An apparatus for displaying a video image on a display, comprising:

a planar panel on which an information storing device is detachably disposed, said information storing device having a sheet plate with a plurality of visual indicia, visually recognizable as visual indicia by an operator, printed at locations on the surface thereof, and an integrated memory stored with a plurality of packets of data to provide signals for causing a video and/or sound effect related to each indicium with addresses corresponding to coordinates of the respective visual indicia on the surface of said sheet plate;

a location detection means having a grid array of electrode wires constituting a predetermined pattern along said planar panel, electromagnetic signal supplying means arranged so as to supply electromagnetic signals to said plurality of electrode wires, and a pickup sensor, said location detection means arranged so as to supply, in response to an operator selecting an indicium by placing said pickup sensor adjacent to the indicium on said sheet plate when the information storing device is disposed on said planar panel, a location signal which is indicative of the location of the selected indicium;

a connection means arranged so as to transmit said plurality of packets of data stored in said integrated memory when said sheet plate is disposed on said planar panel;

a video signal generating means formed so as to generate video signals based on the data supplied from said integrated memory for displaying an image on a video display monitor; and a control means arranged so as to retrieve, responsive to the location signal supplied from said location detection means, the data from one of said plurality of packets of data corresponding to the indicium selected by the operator and generate a signal for causing a video and/or sound effect related to the selected indicium on said video display monitor.

6. An information storing device for use with the apparatus as defined in claim 5 and detachably mountable on the planar panel, comprising a plurality of sheet plates, bound together to form a book, each of said sheet plates being formed with a plurality of visual indicia, visually recognizable as visual indicia by an operator, printed at locations on a surface thereof, an integrated memory integrally assembled with the book and stored with a plurality of packets of data to provide signals for causing a video and/or sound effect relating to said visual indicia with addresses corresponding to coordinates of the respective visual indicia, and a connector means detachably connectable to the connection mean arranged so as to transmit said packets of data to said apparatus.

7. An apparatus for displaying a video image on a display, comprising location detection means having a planar panel on which an information storing device is to be removably mounted, wherein said information storing device comprises: a sheet plate with a plurality of visual indicia, visually recognizable as visual indicia by an operator, printed at locations on the surface thereof, and an integrated read-only memory stored with a plurality of packets of data to provide signals for causing a video and/or sound effect related to each indicium with addresses corresponding to coordinates of the respective visual indicia on the surface of said sheet plate;

a connection means arranged so as to transmit said plurality of packets of data stored in said integrated memory to the apparatus when said sheet plate is disposed on said planar panel;

a video signal generating means formed so as to generate video signals based on the data supplied from said read-only memory for displaying a video image on a video display;

sensor means functionally coupled with said location detection means and arranged so as to provide a location signal which is indicative of the location of the indicium selected by the operator placing said sensor means adjacent to the indicium on said sheet plate when the information storing device is disposed on said planar panel; and control means formed so as to retrieve, responsive to the location signal supplied from said location detection means, the data from one of said plurality of packets corresponding to the indicium selected by the operator and to generate a signal for causing a video and/or sound effect related to the selected indicium on said video display.

8. An information storing device for use with an apparatus as defined in claim 7, the information storing device comprising:

a plurality of sheet plates, bound together in a book-format, each of said sheet plate having a plurality of visual indicia, visually recognizable as visual indicia by an operator, printed at locations on the surface thereof;

an integral read-only memory, integrally assembled and removable with said storing device, the read-only memory stored with a plurality of packets of data to provide signals for causing a video and/or sound effect related to each visual indicium at addresses corresponding to specific locations of the respective visual indicia on the sheet plates; and connector means detachably connectable with said connection means and arranged so as to transmit said packets of information to said apparatus.

9. A system for causing a video image and/or sound effect on a video display monitor in response to an operator's selection, the system comprising a housing and an information storing document, said information storing document comprising:

attachment means formed so that the document can be removably engaged with the housing;

a planar page including thereon a plurality of visible symbols readable by an operator; and memory means integrated into, and removable with, said document, said memory means stored with data to provide signals for causing a video and/or sound effect related to each of the visible symbols at addresses corresponding to locations of each of the visible symbols on the planar page, said housing comprising:

connection means formed so as to interact with the attachment means of the document to removably attach the document to the housing, the connection means also forming a functional connection to the memory means so as to transmit said prerecorded data when information storing document is engaged with the housing;

a video signal generating means formed so as to generate video signals based on the prerecorded data supplied from said memory means for displaying a video image on a video display;

location detecting means including a sensor means formed so as to detect operator's selection of one of symbols by placing the sensor in proximity to said one of symbols and to provide a location signal indicating the location of the selected symbol; and control means, responsive to the location signal, formed so as to retrieve data at the address corresponding to the location of the selected symbol out of the prerecorded data and provide at least one of a visual and an audio output based on the retrieved data corresponding to the selected symbol.

10. In combination, an information storing device comprising:

a plurality of sheet plates, bound together to form a book, each of said sheet plates having a plurality of visual indicia, visually recognizable by an operator, printed at locations on a surface thereof;

an integral read-only memory integrally assembled with the book and stored with a plurality of packets of data to provide signals for causing a video and/or sound effect related to said visual indicia with addresses corresponding to specific locations of the respective visual indicia on the surface of each sheet plate;

a first connector means from which said packets of data are to be transmitted; and an apparatus for displaying a video image on a display, comprising:

location detection means including a first panel on which said information storing device is removably mounted, a second panel disposed separately from said first panel, a pickup sensor which is functionally connected with said first and second panels, and location signal generating means arranged so as to generate location signals representing two-dimensional locations on said first and second panels in response to an operator placing said pickup sensor thereon;

a second connector means to which said first connector means is removably connected so as to transmit the plurality of packets of data from said read-only memory to the apparatus;

a first control means arranged so as to retrieve, responsive to the location signal supplied from said location detection means, a packet of data corresponding to an indicium selected by the operator placing said pickup sensor on the selected indicium on one of the sheet plates mounted on said first panel and so as to provide a video signal in response to the retrieved packet of data; and a second control means arranged so as to provide a change with respect to the displayed image in response to the location signal supplied from said location detection means in response to the operator placing said pickup sensor on a selected location of said second panel.

11. An apparatus for providing data related to an operator's selection, comprising:

a first planar panel which is formed so as to removably attach an information storing device to said planar panel, wherein said information storing device comprises:

a sheet plate with a plurality of visual indicia, visually recognizable as visual indicia by an operator, printed at locations of the surface thereof, memory means integrated into the information storing device and stored with a plurality of packets of information having data to provide signals for causing a video and/or sound effect related to said visual indicia with address representative of locations on the surface of said sheet plate corresponding to positions of the respective visual indicia; and a connector means through which said packets of information are transmitted to said apparatus;

a location detection member comprising a sensor means functionally associated with said planar panel and including a pointer, said location detection member being arranged so as to provide a location signal which is indicative of the coordinates of the visual indicium selected from said plurality of visual indicia by the operator placing the pointer in proximity to the visual indicium;

a connection means which detachably connects to the connector means of said information storing device so as to transmit said packets of information from the memory means when said information storing device attached to said first planar panel;

a control means which, responsive to the location signal supplied from said location member, retrieves the data from one of said plurality of packets of information corresponding to the visual indicium selected by the operator so as to supply a display monitor with a video signal thereby to display on a display screen an image corresponding to the indicia selected by the operator; and a second planar panel disposed at a location spaced apart from the first planar panel of said location detection member and arranged so as to display the image corresponding to the indicium selected by the operator at a desired location on the display screen by the operator touching, with said pointer, said second planar panel at a position corresponding to the desired location on the screen.

12. The information storing device for use with the apparatus as defined in claim 11 and detachably mountable on the first planar panel, comprising a plurality of sheet plates, bound together to form a book, each of said sheet plates being formed with a plurality of visual indicia, visually recognizable as visual indicia by an operator, printed at locations on a surface thereof, memory means integrally assembled with the book and stored with a plurality of packets of data to provide signals for causing a video and/or sound effect related to said visual indicia with addresses corresponding to positions of the respective visual indicia, and a connector means from which said packets of data are to be transmitted to said apparatus.

* * * * *